(12) United States Patent
Reabow et al.

(10) Patent No.: US 11,707,014 B2
(45) Date of Patent: Jul. 25, 2023

(54) PLANTING SYSTEM HAVING SEED FLOW CONTROLLER

(71) Applicant: Dendra Systems Ltd., Oxford (GB)

(72) Inventors: Jared Reabow, Oxford (GB); Hannah Redrup, Oxford (GB); Elena Fernandez-Miranda, Oxford (GB); Jeremie Leonard, Oxford (GB)

(73) Assignee: DENDRA SYSTEMS LTD., Oxford (GB)

( * ) Notice: Subject to any disclaimer, the term of this patent is extended or adjusted under 35 U.S.C. 154(b) by 429 days.

(21) Appl. No.: 16/927,778

(22) Filed: Jul. 13, 2020

(65) Prior Publication Data
US 2022/0007567 A1 Jan. 13, 2022

(51) Int. Cl.
| | | |
|---|---|---|
| *A01C 7/20* | (2006.01) | |
| *B64D 1/02* | (2006.01) | |
| *A01C 21/00* | (2006.01) | |
| *A01B 79/00* | (2006.01) | |
| *B64U 10/13* | (2023.01) | |

(52) U.S. Cl.
CPC .............. *A01C 7/20* (2013.01); *A01B 79/005* (2013.01); *A01C 21/005* (2013.01); *B64D 1/02* (2013.01); *B64U 10/13* (2023.01)

(58) Field of Classification Search
CPC ........... A01C 7/20; A01C 7/00; A01C 21/005; A01C 21/00; A01B 79/005; A01B 79/00; B64D 1/02; B64D 1/00; B64C 2201/027; B64C 2201/02; B64C 2201/00
See application file for complete search history.

(56) References Cited

U.S. PATENT DOCUMENTS

| | | | |
|---|---|---|---|
| 771,137 A * | 9/1904 | Frerking ................ | A01C 15/16 222/281 |
| 4,537,333 A | 8/1985 | Bjerregaard | |
| 5,944,264 A * | 8/1999 | Truax ...................... | A01C 7/02 239/152 |
| 2018/0263177 A1* | 9/2018 | Heathcote .............. | A01C 19/02 |

FOREIGN PATENT DOCUMENTS

| | | | |
|---|---|---|---|
| CN | 206760016 U | 12/2017 | |
| CN | 108750116 A * | 11/2018 | ............... B64D 1/16 |
| CN | 208963317 U | 6/2019 | |
| CN | 209274903 U | 8/2019 | |
| CN | 210298508 U | 4/2020 | |

OTHER PUBLICATIONS

Examination Report for Australian Patent Application No. 2020227016, dated May 11, 2021, pp. 4.

* cited by examiner

*Primary Examiner* — Christopher J. Novosad
(74) *Attorney, Agent, or Firm* — Womble Bond Dickinson (US) LLP

(57) ABSTRACT

A planting system includes a seed flow controller coupled to a hopper and a spreader. The seed flow controller, hopper, and spreader are transported by an unmanned aerial vehicle to spread the seeds over a geography. The seed flow controller includes several rollers having apposed outer surfaces. The rollers also include fins that extend about respective roller axes such that the fins cross at discrete contact points as the rollers rotate. The interfacing rollers break up clumps of seed material stored in the hopper and controllably convey the seed material from the hopper to the spreader. The spreader has a spinning spreader plate that flings the seed material laterally outward to spread the seed material over the ground.

20 Claims, 10 Drawing Sheets

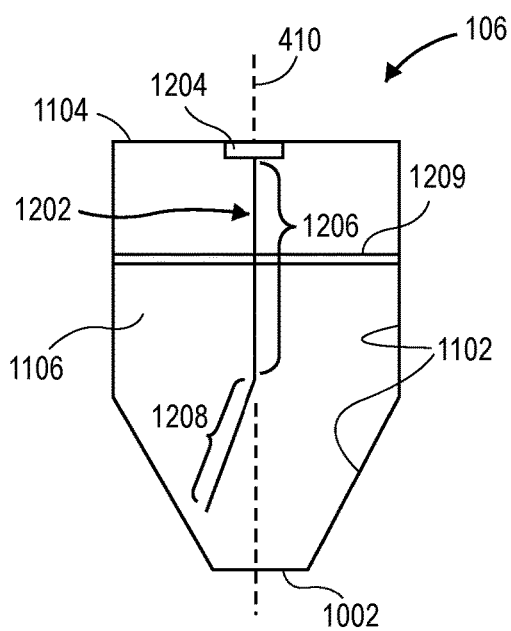
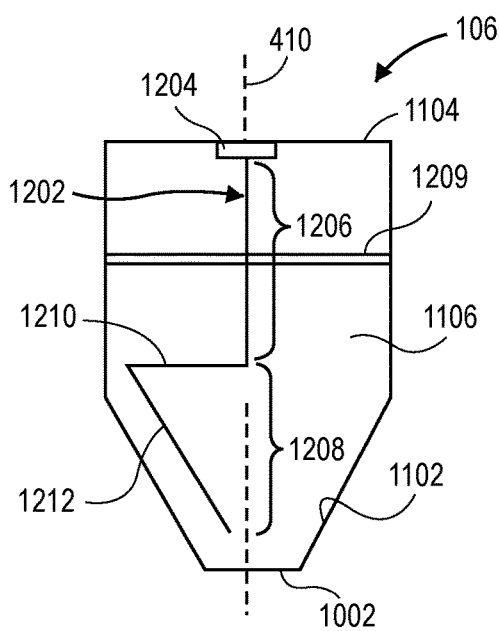
FIG. 12A  FIG. 12B
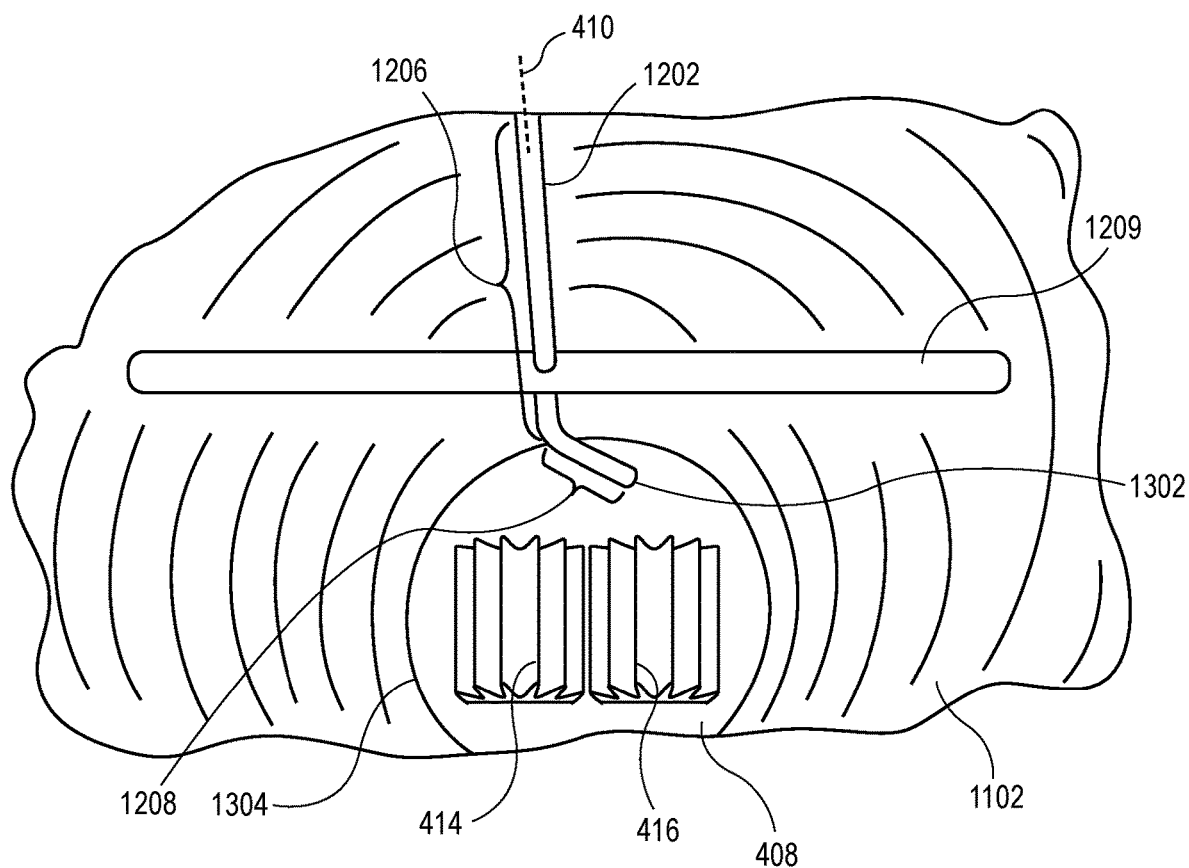
FIG. 13

PLANTING SYSTEM HAVING SEED FLOW CONTROLLER

BACKGROUND

Field

The present disclosure relates to systems for dispensing particles. More specifically, the present disclosure relates to planting systems for dispensing seeds.

Background Information

There are existing techniques for dispensing particles, such as fertilizer or seed, in both agricultural and non-agricultural endeavors. For example, crop planters exist that dispense agricultural seeds to produce crops. Such planters commonly have a seed container that holds the seeds prior to dispensing the seeds through a metering system. The crop planters may have one or more horizontal augers located within the seed container to agitate and transfer the seeds from the seed container to the metering system. The metering system can include a slot through which seeds exit the seed container to be spread onto the ground. Non-agricultural endeavors, such as reseeding to revegetate geographies that have been negatively impacted by influences such as fire, over-grazing, etc., can also utilize planting systems. The planting systems can spread non-agricultural seeds over the geography, rather than spread agricultural seeds within well-defined crop boundaries.

A morphology and anatomy of seeds can vary widely by seed type. For example, some agricultural seeds, such as millet, oat, or wheat, may have a seed coat texture that differs substantially from other agricultural or non-agricultural seeds. For example, the texture and anatomy of millet seeds may cause the seeds to be far less likely to bind together than, for example, some Australian grass seeds that have fibers or hairs extending from the seed coat. Thus, the conventional seed containers, augers, and metering systems developed for use with some seeds types, such as millet, may interact differently with other seed types.

SUMMARY

Conventional augers have been found to poorly agitate seed types having seed coats that include fibers or hairs. The texture of such seed types can cause them to bind together, and the constant rotational motion of the auger may fail to agitate the seeds sufficiently to cause the seeds to enter the metering system. More particularly, when certain seed types are held in a seed container and agitated by a horizontal auger, the seeds compress, bind together, and do not slide into the metering system located at a base of the seed container. Moreover, the seeds can become stuck within the metering system itself. Under such conditions, conventional planting systems fail to adequately control the dispensation of seeds, which may result in inconsistent or insufficient seeding of a target geography.

A planting system is provided. The planting system can include a seed flow controller coupled to an unmanned aerial vehicle (UAV). The UAV can transport the seed flow controller over a target geography while the seed flow controller conveys or dispenses seed material over the target geography. In an embodiment, the seed flow controller is coupled to a hopper that stores the seed material. The seed flow controller can controllably and predictably convey the seed material from the hopper to a spreader, which is also coupled to the seed flow controller, for spreading over the target geography. In an embodiment, the seed flow controller includes a housing having a housing inlet to receive seed material from a hopper outlet of the hopper and a housing outlet to provide seed material to a spreader plate of the spreader.

The seed flow controller includes several rollers to grip, break up, and convey the seed material as it passes through a housing cavity between the housing inlet and the housing inlet. In an embodiment, the rollers include a first roller and a second roller having respective outer surfaces that are apposed to each other. For example, the outer surfaces may be on outer edges of fins that extend about respective roller axes of the rollers. More particularly, the first roller can have a first fin extending about a first roller axis and the second roller can have a second fin extending about a second roller axis, and the fins can cross each other in contact at a contact point. The seed material can be gripped at the contact point and pulled downward through the housing cavity by the rotating rollers.

In an embodiment, the roller fins extend about the respective roller axes at an angle to a longitudinal plane containing the respective roller axis. More particularly, rather than extending entirely in a longitudinal direction, the fins can twist about the roller axis, e.g., in a helical direction. The twisting fins can therefore contact each other at discrete and limited contact points over a length of the apposing rollers, and the contact points can change longitudinal locations as the rollers rotate. Accordingly, rather than becoming jammed between a lengthy clamping region, the seed material can be gripped and manipulated in a manner that reduces a likelihood of material jamming. A clocking, or twist direction, of the fins can be the same or different. For example, the first fin can extend about the first roller axis in a first helical direction, e.g., clockwise, and the second fin can extend about the second roller axis in a second helical direction, e.g., either clockwise or counterclockwise, about the second roller axis.

The rollers of the seed flow controller can be driven by a drive mechanism that includes a key shaft engaged to a keyway. For example, the drive mechanism can include a key shaft having a cross-sectional profile, e.g., a rectangular profile, that matches a cross-sectional profile of a keyway extending along a corresponding roller axis. The key shaft and keyway can therefore transmit torque directly from a drive motor to the roller. The roller may also be easily removed from the key shaft, providing a modular construction that makes the replacement of the roller straightforward and quick to perform in the field.

The hopper can include an agitator mounted within a hopper cavity to mix and agitate the seed material while the seed flow controller is conveying the seed material to the spreader. The agitator can have an agitator arm that is located within the storage area for the seed material. In an embodiment, an entirety of the agitator arm that is located within the seed material is moving. More particularly, the agitator may be mounted such that no stationary surfaces of the agitator, e.g., a motor housing, are located within the storage area that contains seed material. Accordingly, a likelihood of bridging and residue of the seed material on the agitator may be reduced. Thus, the agitator facilitates reliable and complete emptying of the hopper into the seed flow controller.

In an embodiment, the seed spreader includes the rotatable seed plate to eject seed material laterally over the target geography. The seed plate can include blades that extend radially outward from a central axis of the spreader. For example, the blades can extend along a straight path in a radial direction, or along a curved path having a radial and circumferential component. The blades can create suction to draw the seed material downward from the seed flow controller, and can affect an ejection speed of the seed material as it is redirected radially outward from the central axis. Accordingly, the spreader plate can control the downward movement of the seed material within the planting system and the coverage of the seed material over the target geography.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 12A-12B are schematic views of a hopper including an agitator, in accordance with an embodiment.

FIG. 13 is a pictorial view of an agitator within a hopper, in accordance with an embodiment.

DETAILED DESCRIPTION

Figure 1:
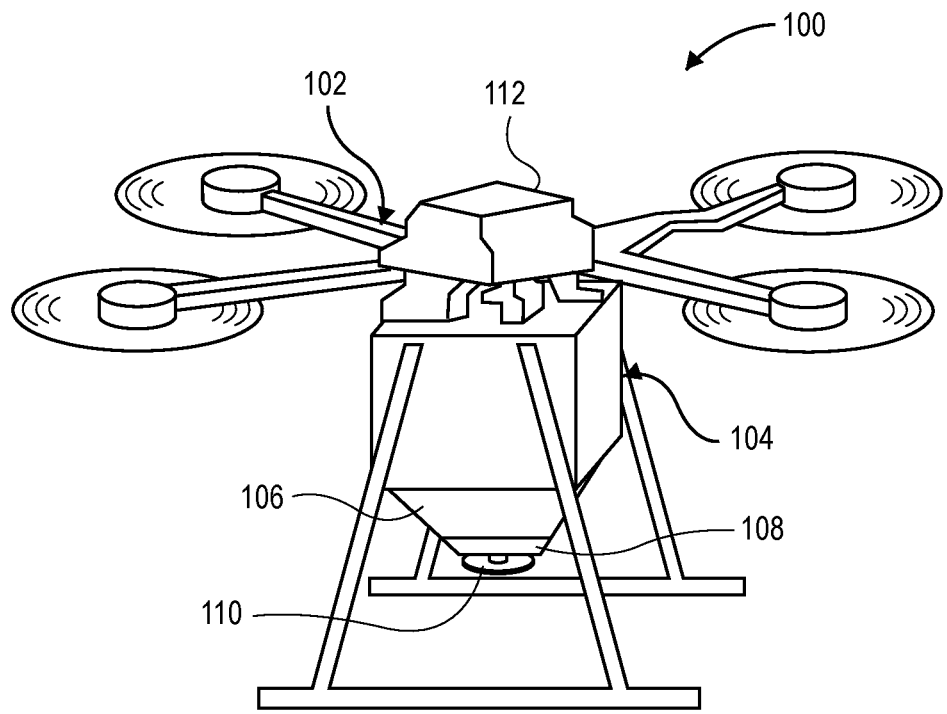
FIG. 1 is a perspective view of a planting system, in accordance with an embodiment.

Embodiments describe a planting system including a seed flow controller to convey seeds. The seed flow controller includes several rollers having apposed outer surfaces to break up and convey seed material between a hopper and a spreader. Accordingly, the planting system can be used to spread seeds, such as native Australian grass seeds, over a target geography. Although the seed flow controller is mainly described below with respect to use in a planting system for conveying seeds, the seed flow controller may be incorporated in systems used to dispense other particulate matter. For example, the seed flow controller can convey and dispense fertilizer in a fertilizer spreader. Thus, reference to the seed flow controller and the planting system are not limiting, and the terms may be generalized as being a material flow controller and a spreading system having the same or similar structures as those described below.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "upward" may indicate a first direction along a central axis of a seed flow controller. Similarly, "downward" may indicate a second direction opposite to the first direction. Such terms are provided to establish relative frames of reference, however, and are not intended to limit the use or orientation of a planting system or a seed flow controller to a specific configuration described in the various embodiments below.

In an aspect, a seed flow controller for use in a planting system to break up and convey seeds is provided. The planting system can spread the seeds over a target geography. For example, the target geography may be a rugged or inaccessible terrain, and thus, the planting system may include an unmanned aerial vehicle (UAV) to carry a hopper containing the seeds, the seed flow controller to convey the seeds from the hopper to a spreader, and the spreader to eject the seeds over the target geography. In an embodiment, the seed flow controller includes several rollers having apposed outer surfaces. The rollers can rotate to cause the outer surfaces to move relative to each other. The rollers can have fins that engage at contact points, and as the rollers rotate, the contact points can break up seed material and convey the seed material downward from the hopper to the spreader. The relative movement of the rollers and the moving contact points between the fins reduces a likelihood of the seed material binding within the seed flow controller. Accordingly, the seed flow controller can convey the seed material at a controllable rate to provide predictable seeding of the target geography.

Referring to FIG. 1, a perspective view of a planting system is shown in accordance with an embodiment. The planting system 100 can include a mobile transport system to transport a seeding system 104 over a target geography. The mobile transport system can be a ground-based system, such as a tractor, or an airborne system, such as an unmanned aerial vehicle (UAV) 102. The seeding system 104 can include a hopper 106 to contain seed material to spread over the target geography, a seed flow controller 108 to break up and convey the seed material from the hopper 106 to a spreader 110, and the spreader 110 to eject the seed material over the target geography. Accordingly, the seeding system 104 can be mounted on the UAV 102 and the UAV can carry the seeding system 104 to spread seeds over the ground as the UAV traverses a planting pattern.

In an embodiment, the UAV 102 is a quadcopter-style UAV or drone. The UAV 102, however, may be another type of UAV, such as a fixed wing drone, rotary-controlled drone, blimp, manually operated plane or helicopter, ultra-lite glider, or other aerial platform. Alternative copter-style drones include drones having a single blade, eight-blades, etc. In the case of a ground-based system, the seeding system 104 can be mounted on an automobile, bicycle, motorcycle, hand-pushed cart, an animal-drawn attachment, a land-based robotic system, or any other ground-based platform.

The seeding system 104 can contain a payload that is ready to be dispensed, spread, or planted. The payload can include any particulate that behaves, as a group, as a non-Newtonian fluid. For example, the payload may include agricultural seeds such as millet. Alternatively, the payload can include non-agricultural grass seeds, such as native Australian grass seed. The payload may include particulate that is non-biological. For example, the payload may include fertilizer to be spread over the target geography. In an embodiment, the payload is a mixture of agricultural grass seeds, non-agricultural grass seeds, and/or non-biological particulate. For example, the payload may include a mixture of Australian grass seeds and one or more tree or shrub seeds. At least some of the seed material can have wisps, spikes, jagged edges, etc., which tend to bind together.

The planting system 100 can include an electronics housing 112 containing electronics to control the operations of the UAV 102 and/or the seeding system 104 carried by the UAV. The electronics housing 112 may contain one or more processors that receive inputs from various sensors of the planting system 100. For example, the planting system 100 can include several onboard sensor devices that capture data relating to the position and orientation of the UAV 102. The one or more processors can process the sensor input data to determine outputs for controlling the planting system operation. By way of example, the one or more processors may provide an onboard navigation system that uses data from global positioning system (GPS) or other sensors mounted on the UAV 102 to determine a location of the planting system 100 in relation to the target geography. The planting system 100 can include control software, which when executed by the one or more processors, automates the activities of the aerial and/or land-based mobile transport platform to follow a planting pattern over the target geography.

The electronics module can contain wireless communication hardware, such as a Global System for Mobile Communications (GSM) module (modem to communicate and receive and transmit modes), to allow communication between the planting system 100 and a remote controller. For example, the communication hardware can connect wirelessly to a ground station or a mobile device. The ground station or the mobile device can be used by an operator to remotely control operation of the mobile transport system and/or the seeding system 104.

Figure 2:
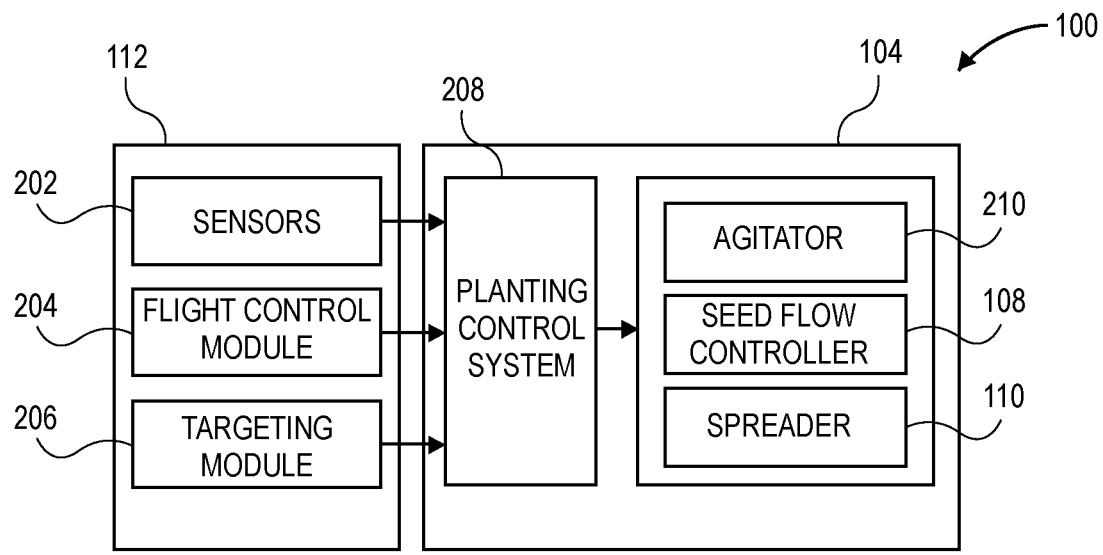
FIG. 2 is a block diagram of a seeding system, in accordance with an embodiment.

Referring to FIG. 2, a block diagram of a planting system is shown in accordance with an embodiment. Sensors and modules of the planting system 100 can be housed in the electronics housing 112. For example, the planting system 100 can include one or more sensors 202, a flight control module 204, and a targeting module 206. The sensors can include a GPS module, visual, multispectral, hyperspectral, RADAR, light imaging detection and ranging (LiDAR), and infrared sensors, and visual cameras which register where seeds are planted and record the surroundings of the planting process. In some embodiments, sensors may include communication modules such as receivers, transmitters, transceivers, etc. The flight control module 204 can include a communications module to obtain flight commands from an operator, other mobile transport platform, or other system. The targeting module 206 can include a communications module to obtain targeting commands from a user, other mobile transport platform, or another system.

The sensors and modules can output data to the seeding system 104. The targeting module 206 can automatically send a dispense seed command to a planting control system 208 based on location, e.g., when a current GPS location is within the predefined boundaries of the target geography. In an embodiment, once the planting system 100 is near a predefined location, a live display of the target geography as viewed from the planting system 100 is displayed to a user, enabling the user to manually send the dispense seed command.

The planting control system 208 can be in a same or different enclosure of the electronics housing 112 as the sensors 202 and/or modules 204, 206. The planting control system 208 can manage agitation, dispensation, and spreading of the seed material by the seeding system 104. As described below, the seeding system 104 can include an agitator 210 to mix and agitate the seed material within the hopper 106. The seeding system 104 can also include the seed flow controller 108 to convey the seed material from the hopper 106 to the spreader 110, and the spreader 110 to spread the seeds onto the ground below the mobile transport system. In an embodiment, the planting control system 208, which may include one or more processors executing agitation, conveyance, and/or spreading algorithms, can provide outputs to control the mechanical function of the agitator 210, the seed flow controller 108, and/or the spreader 110. By way of example, the planting control system 208 can control a rate of rotation of several rollers in the seed flow controller 108 to controllably convey seed material between the hopper 106 and the spreader 110.

Figure 3:
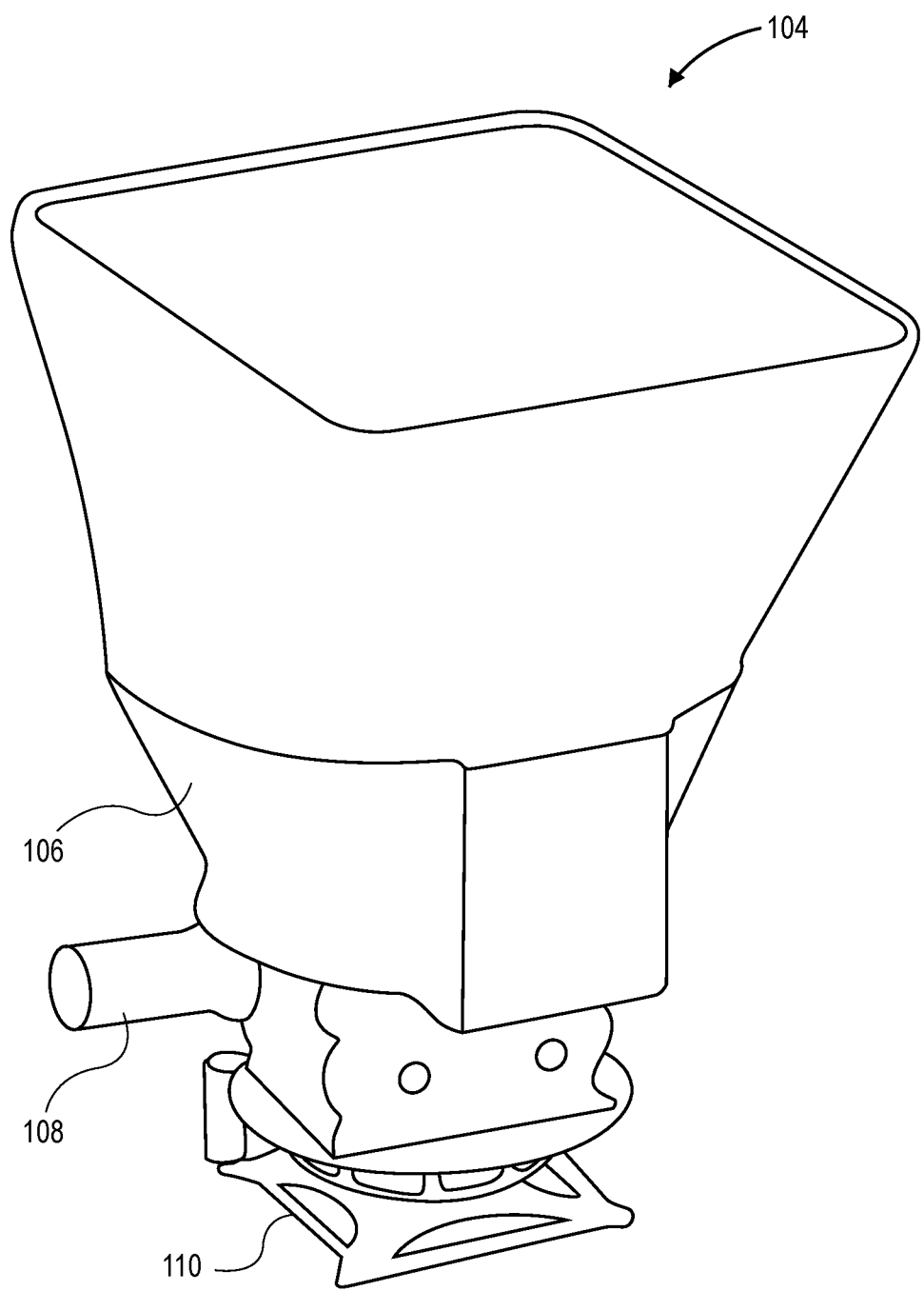
FIG. 3 is a perspective view of a seeding system, in accordance with an embodiment.

Referring to FIG. 3, a perspective view of a seeding system is shown in accordance with an embodiment. The seeding system 104 can be mounted on the UAV 102 as described above, and thus, the hopper 106, the seed flow controller 108, and the spreader 110 can be coupled to the UAV 102. Furthermore, the seeding system components are coupled to each other. More particularly, the hopper 106 is coupled to the seed flow controller 108, and the seed flow controller 108 is coupled to the spreader 110. As described below, the seeding system 104 overcomes the shortfalls of existing seed spreaders 110, which are unable to deal with clumping and binding of certain seed materials. More particularly, existing seed spreaders are unable to controllably spread problem materials in their raw (non-pre-processed) form. In the context of this description, a problem material may be defined as: a material having a fluffy, hook-and-loop, or cotton ball-like characteristic; a material that clamps or sticks together when in contact with itself; a material that sticks to other things when in contact; or a material that binds into bridges due to a material morphology. Problematic materials can bridge, jam, or otherwise block existing seed spreaders, causing unreliable operation and uncontrollable spreading of the problem materials. By contrast, the seeding system 104 can break up clumps in problematic seed material, and feed the separated material from the hopper 106 to the spreader 110 at a controllable and predictable rate. As such, the seeding system 104 is able to spread the material consistently over the target geography. Furthermore, because the seed material is conveyed at a controllable rate, the spreader 110 can spread the material as far as possible with a reduced likelihood of damage to the seed material.

Figure 4:
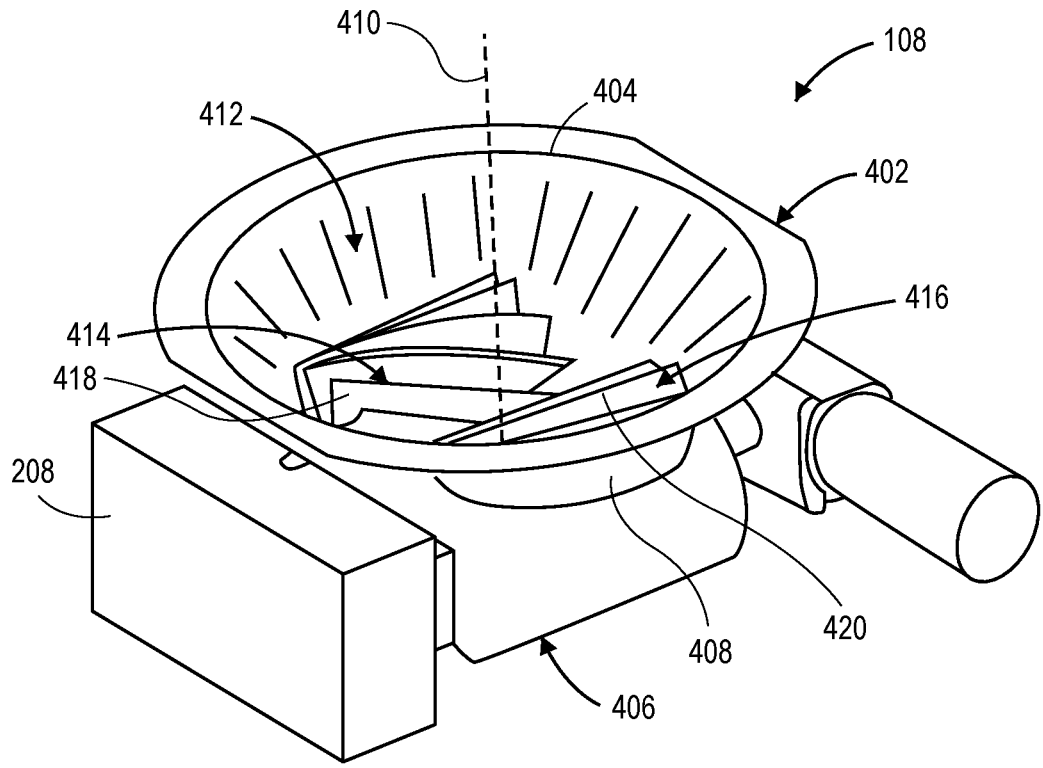
FIG. 4 is a top perspective view of a seed flow controller, in accordance with an embodiment.

Referring to FIG. 4, a top perspective view of a seed flow controller is shown in accordance with an embodiment. The seed flow controller 108 of the seeding system 104 includes a container. Moving rollers can be held in close proximity to each other near an exit side of the container. The seed flow controller 108 can work with problem materials, meaning that the seed flow controller 108 can controllably convey a wide range of seed materials from the hopper 106 to the spreader 110.

In an embodiment, the seed flow controller 108 includes a housing 402 having a housing inlet 404 and a housing outlet 406. The housing inlet 404 can be coupled to a hopper outlet (FIG. 11) of the hopper 106. Accordingly, seed material can enter the seed flow controller 108 from the hopper 106 through the housing inlet 404. A housing wall 408 extends downward along a central axis 410 of the seeding system 104 between the housing inlet 404 and the housing outlet 406. More particularly, the housing wall 408 extends about the central axis 410 and around a housing cavity 412 through which the seed material passes from the housing inlet 404 to the housing outlet 406. The housing wall 408 can funnel seed material from the housing inlet 404 toward the housing outlet 406. For example, the housing wall 408 can be tapered over an upper section of the seed flow controller 108 such that a transverse dimension of the housing inlet 404 is greater than a transverse dimension of the housing outlet 406. The tapered profile of the housing wall 408 can guide the seed material radially inward to be dispensed through the housing outlet 406 onto the spreader 110 (FIG. 3) below the seed flow controller 108.

Conveyance of the seed material from the housing inlet 404 to the housing outlet 406 may not be possible under gravity feed alone. For example, problem materials may bind and bridge across the housing cavity 414 rather than slide downward through the housing outlet 406. To provide a controllable rate of conveyance, the seed flow controller 108 includes a multi-roller system to break up seed material and to sweep the seed material from the funnel-shaped upper section of the seed flow controller 108 through the housing outlet 406. The multi-roller system can include a first roller 414 mounted within the housing cavity 412 over the housing outlet 406, and a second roller 416 mounted within the housing cavity 412 over the housing outlet 406 adjacent to the first roller 414.

The rollers of the seed flow controller 108 may be suspended in the housing 402 and positioned such that rotation of the rollers, e.g., when driven by a motor unit, pulls the seed material from a portion of the housing cavity 412 above the rollers and pushes the seed material into a portion of the housing cavity 412 below the rollers. For example, the first roller 414 can include a first outer surface 418 and the second roller 416 can include a second outer surface 420 apposed to the first outer surface 418. The apposed surfaces may be located such that one or more points along the outer surfaces come into contact. The seed material can be gripped at these contact points and conveyed downward by the roller system. The position of the rollers and/or a distance between the outer surfaces can be tightly controlled to limit or eliminate the flow of seed material from the internal opening above the rollers to the external opening below the rollers when the rollers are not rotating.

Figure 5:
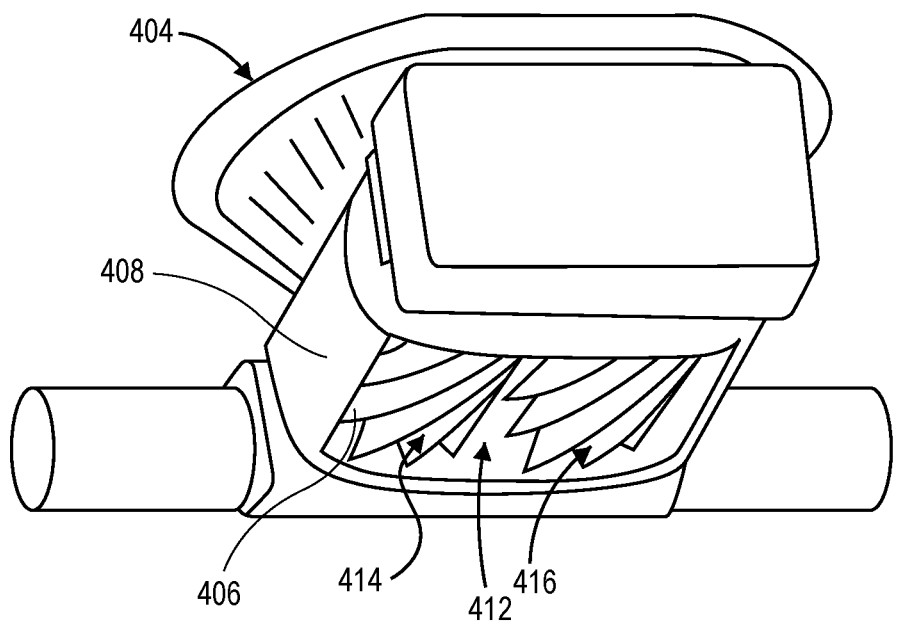
FIG. 5 is a bottom perspective view of a seed flow controller, in accordance with an embodiment.

Referring to FIG. 5, a bottom perspective view of a seed flow controller is shown in accordance with an embodiment. In the bottom view it is apparent that the first roller 414 in the second roller 416 can be mounted entirely within the housing cavity 412 above the housing outlet 406. Alternatively, the rollers may be partially exposed below the housing outlet 406. For example, the rollers may be mounted such that the outer surfaces are vertically below the housing outlet 406 at a six-o-clock position and vertically above the housing outlet 406 at a twelve-o-clock position. In either case, a laterally outward surface of the rollers can conform to the housing wall 408. More particularly, a distance between the housing wall 408 and the rollers along a laterally outward region of the outer surface may be zero or close to zero such that the seed material does not pass between the rollers 414, 416 and housing wall 408 from the internal opening to the external opening of the seed flow controller 108. Accordingly, the only path available for the seed material to pass through the rollers may be between the rollers as they rotate.

Figure 6:
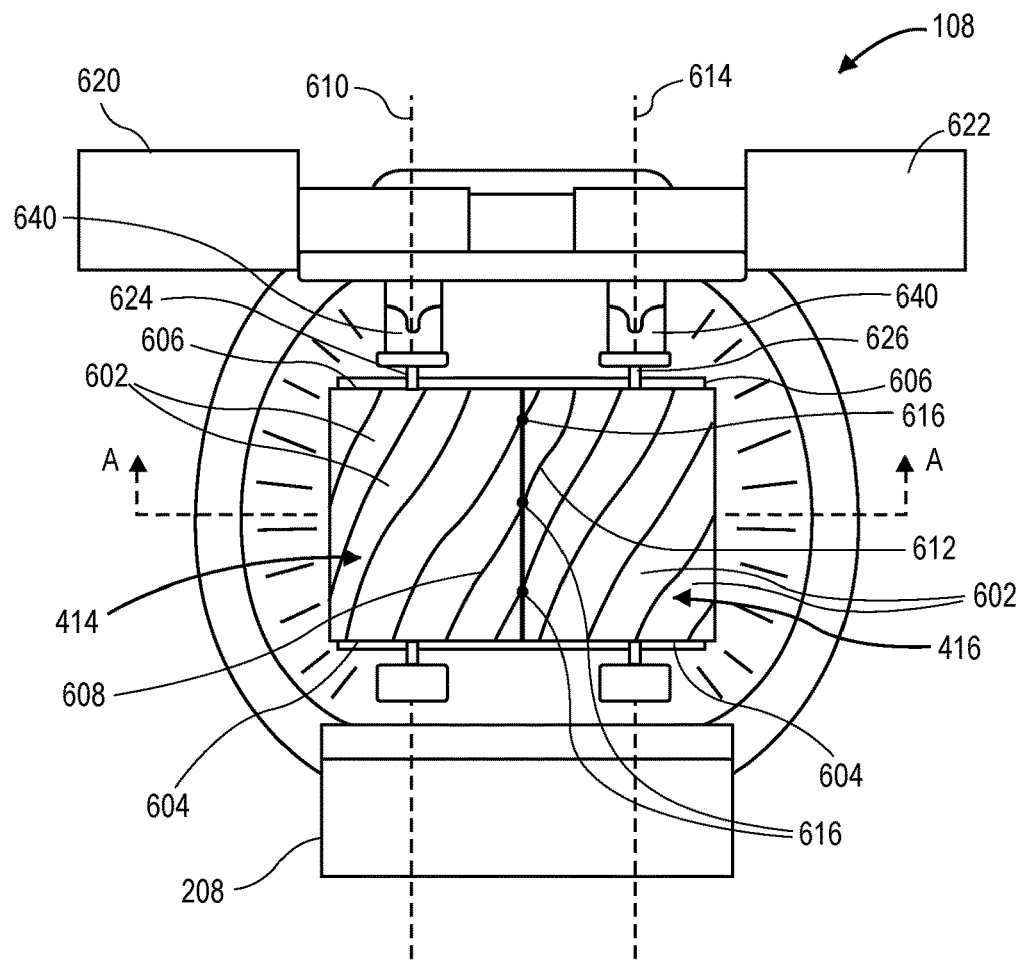
FIG. 6 is a top view of a seed flow controller, in accordance with an embodiment.

Referring to FIG. 6, a top view of a seed flow controller is shown in accordance with an embodiment. Each of the rollers in the roller system can have respective fins 602 that break up, grip, and advance the seed material through the housing cavity 412. In an embodiment, the first roller 414 includes several fins 602 extending substantially longitudinally between a first roller end 604 and a second roller end 606. The fins 602 of the first roller 414 can include a first fin 608 extending about a first roller axis 610 of the first roller 414. Similarly, the second roller 416 includes several fins 602 extending substantially longitudinally between respective roller ends 604, 606. Like the first roller 414, the second roller 416 can include a second fin 612 extending about a second roller axis 614 of the second roller 416.

The roller fins 602 can extend between the roller ends essentially in a longitudinal direction parallel to the roller axes. For example, the fin surfaces of one or more of the rollers may extend straightly in the longitudinal direction between the first roller end 604 and the second roller end 606. The path of the fins 602, however, may not be entirely longitudinal. More particularly, in an embodiment, the fin surfaces of one or more of the rollers extend in a direction that has a circumferential component. Accordingly, the fin surfaces of either or both of the rollers can twist about and/or around the roller axes 610, 614 as they extend from the first roller end 604 to the second roller end 606.

A direction of twist of the roller fins 602 may be the same or different for each roller. The direction of twist may be the same for both rollers. Accordingly, the first fin 608 can extend about the first roller axis 610 with the same clocking at the second fin 612 extends about the second roller axis 614. For example, as shown in FIG. 6, the clocking of both rollers may be in a clockwise direction (based on the right hand rule). Alternatively, the clocking of the fins 602 of the first roller 414 may be different than the clocking of the fins 602 of the second roller 416 (fins 602 of one roller may be clockwise and fins 602 of the other roller may be counter-clockwise). A same clocking of the twist in both fins 602 can result in the outer surfaces of the fins 602 making contact at discrete contact points 616. More particularly, the first fin 608 and the second fin 612 can extend about their respective roller axes with the same clocking such that the first fin 608 crosses the second fin 612 at a contact point 616. The contact points 616 between the fins 602 of the rollers may occur at discrete locations along the interface between the roller outer surfaces. The discrete locations may be multiple contact points 616 between the same fins 602, e.g., the first fin 608 and the second fin 612, or single contact points 616 between multiple fins 602, e.g., a first contact point 616 between the first fin 608 and a second fin 612 and a second contact point 616 between a third fin of the first roller 414 and a fourth fin of the second roller 416.

The geometry of the fins 602 and the resultant contact points 616 are described further below. At this point, however, it will be understood that the direction and degree of twist of the fins 602 on each of the rollers influences the number of contact points 616 between the apposed outer surfaces. The direction and degree of twist can be altered to create more or fewer contact points 616 based on the seed material. For example, it has been discovered that jamming of the seed flow controller 108 may occur more often when consistent contact is made between the outer surface of the roller and another surface, such as the housing wall 408. Accordingly, a slight fin twist may be used to minimize a number of contact points 616 along the apposed outer surfaces to enhance the breaking up and conveyance of the seed material from the hopper 106 to the spreader 110 without inducing jamming.

Figure 7:
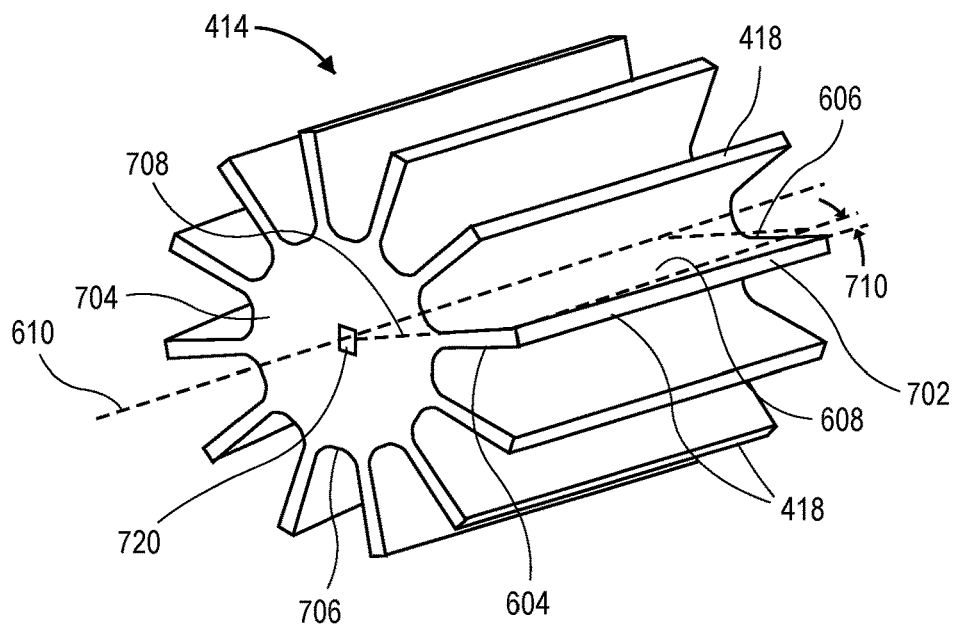
FIG. 7 is a perspective view of a roller of a seed flow controller, in accordance with an embodiment.

Referring to FIG. 7, a perspective view of a roller of a seed flow controller is shown in accordance with an embodiment. The first roller 414 is described by way of example. The second roller 416 may have a same or similar structure to the first roller 414. Alternatively, the second roller 416 may have a different structure, however, the rollers can cooperate to form contact points 616 that break up and convey seed material from the hopper 106 to the spreader 110.

In an embodiment, the first outer surface 418 of the first roller 414 extends along the outer edges of the fins 602. For example, the first outer surface 418 can be on a first outer edge 702 of the first fin 608. Similarly, the first outer surface 418 can be on the outer edges of the fins 602 adjacent to the first fin 608. The first outer edge 702 can face radially outward from the first roller axis 610. In an embodiment, the roller includes a roller core 704 that extends along the first roller axis 610. The roller core 704 can have an outer core surface 706 at a radial dimension from the first roller axis 610. Similarly, the outer edge can be a radial dimension from the first roller axis 610. The first fin 608 can extend radially outward from the outer core surface 706 to the first outer edge 702. Accordingly, the first fin 608 has a fin height equal to the difference between the radial dimensions of the outer core surface 706 and the first outer edge 702.

The twist of the first fin 608 (and the other fins 602 of the first roller 414) about the first roller axis 610 can be defined relative to a longitudinal plane 708 containing the first roller axis 610. The longitudinal plane 708, which is represented by a rectangle 710 having a dotted perimeter, can extend radially outward from the first roller axis 610 in line with a circumferential edge of the first fin 608 at the first roller end 604. The longitudinal plane 708 can define a zero-degree radial direction, and the first fin 608, as it extends from the first roller end 604 to the second roller end 606, can extend about the first roller axis 610 at an angle 710 to the longitudinal plane 708.

The angle 710 of the fins 602 may have a slight twist. The angle 710 of twist may be in a range that allows for enough twist to bring the fins 602 of both rollers into contact at discrete contact points 616, but the angle 710 may be small enough that it does not allow for a flow path for seed materials to pass through when the rollers are not spinning. In an embodiment, the angle 710 is in a range of 0-20 degrees. For example, a twist angle 710 of 5 degrees has been shown to produce controllable conveyance of seed material without causing jamming of the seeds between the rollers.

Figure 8:
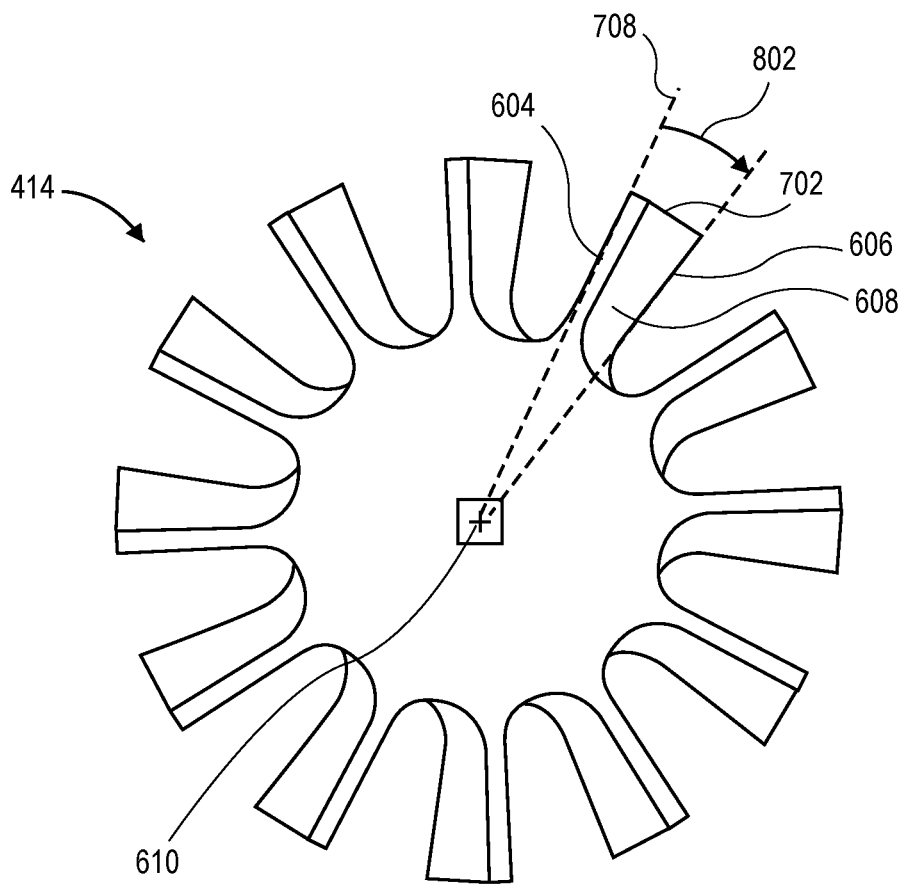
FIG. 8 is an end view of a roller of a seed flow controller, in accordance with an embodiment.

Referring to FIG. 8, an end view of a roller of a seed flow controller is shown in accordance with an embodiment. The first fin 608 of the first roller 414 may extend at a constant angle 710 to the longitudinal first roller axis 610 as the fin twists about the first roller axis 610. Alternatively, the first fin 608 may follow a curved path as it extends from the first roller end 604 to the second roller end 606. Accordingly, the twist of the fin may be defined based on relative circumferential positions of the fin at the first roller end 604 and the second roller end 606.

In an embodiment, the longitudinal plane 708 extends radially outward from the first roller axis 610 and along the circumferential edge of the first fin 608 at the first roller end 604. The longitudinal plane 708 can define the zero-degree position. Accordingly, the first fin end (at first roller end 604) can be at the zero-degree position. This may also be stated as the first fin end being spaced from the longitudinal plane 708 by a distance of zero. By contrast, the second fin end (at second roller end 606) may be circumferentially offset from the longitudinal plane 708 by a circumferential angle and/or distance. For example, the second fin end can be circumferentially offset from the longitudinal plane 708 by a circumferential angle of 10 degrees, which can correspond to a circumferential offset 802. Accordingly, regardless of whether the first outer edge 702 extends linearly or curvilinearly between the first roller end 604 and the second roller end 606, the twist in the fin can produce a circumferential offset 802 between the first roller end 604 and the second roller end 606.

In addition to the twist of the fins 602, other characteristics of the rollers that may be varied to control seed conveyance includes a fin density and a roller material. The fin density can be varied to accommodate seed size. More particularly, the number of fins distributed about the first roller axis 610 can change a volume and/or a size of the seed material that can be effectively conveyed. Accordingly, the rollers may have a higher number of fins 602 to increase fin density for the distribution of smaller seed material, and vice versa. A material used to form the rollers can also affect performance of the rollers. For example, rollers formed from a rigid material have been shown to perform favorably with most seed materials. Nonetheless, it is contemplated that the rollers may be formed from a flexible material. Accordingly, although the direction and degree of twist in the fins 602 has been shown to be a primary variable in effectively conveying seed material from the hopper 106 to the spreader 110, it is contemplated that other modifications to the roller design may be introduced and still achieve the benefits of the multi-roller seed flow controller 108.

Figure 9:
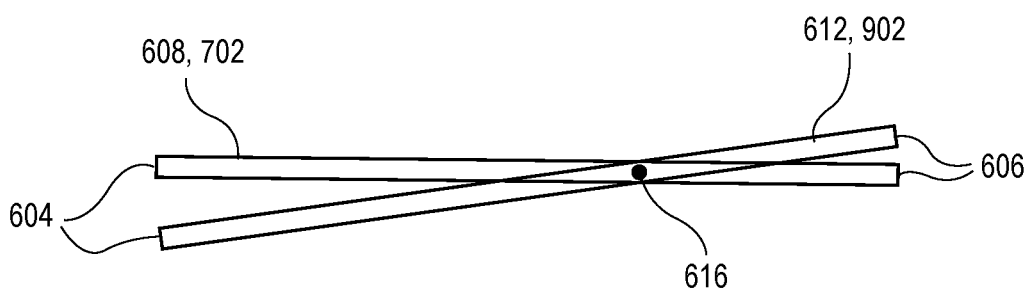
FIG. 9 is a schematic view of a contact point between several rollers of a seed flow controller, in accordance with an embodiment.

Referring to FIG. 9, a schematic view of a contact point between several rollers of a seed flow controller is shown in accordance with an embodiment. The first fin 608 and the second fin 612 can twist about respective roller axes in the same direction. The similar clocking of the roller fins causes the fins to cross at a contact point 616 along the apposed outer surfaces. More particularly, a first outer edge 702 of the first fin 608 can face a second outer edge 902 of the second fin 612 at the contact point 616. When the outer edges of the fins 602 are brought into contact, e.g., by suspending the rollers at a predetermined distance from each other, the contact point 616 acts as a grip point that grabs and pulls seed material downward through the rollers. For example, it will be appreciated that as the rollers spin in a first direction, the contact point 616 will move in a first longitudinal direction, e.g., toward the first roller end 604. By contrast, rotation of the rollers in a second direction opposite to the first direction will move the contact point 616 in a second longitudinal direction, e.g., toward the second roller end 606.

Figure 10:
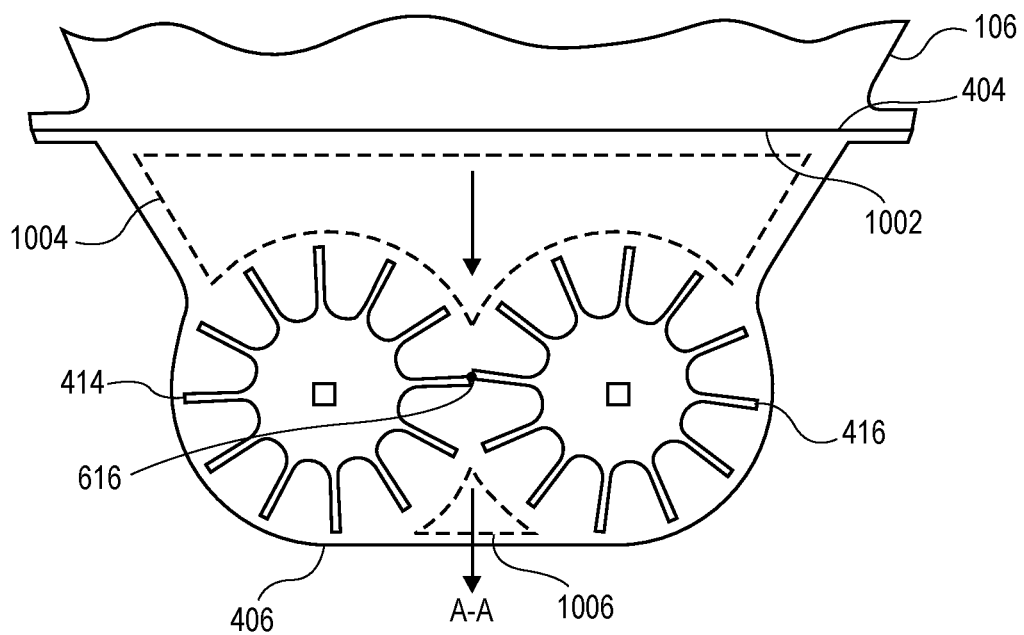
FIG. 10 is a cross-sectional view, taken about line A-A of FIG. 6, of a seed flow controller, in accordance with an embodiment.

Referring to FIG. 10, a cross-sectional view, taken about line A-A of FIG. 6, of a seed flow controller is shown in accordance with an embodiment. The moving contact point 616 can apply stresses to the seed material that break the seed material up and tug the seed material downward. More particularly, the one or more contact points 616 between the first fin 608 and the second fin 612 can convey the seed material downward through the apposing rollers as the seed flow controller 108 operates. The seed material can therefore traverse a path from a hopper outlet 1002 of the hopper 106 into the housing inlet 404 and a first region 1004 of the housing cavity 412 above the rollers. The seed material can be gripped and pulled downward between the rollers to be dispensed from the first region 1004 of the housing cavity 412 into a second region 1006 of the housing cavity 412 (shown by a path of downward arrows). The seed material can then be pushed outward and downward through the housing outlet 406. Accordingly, the seed flow controller 108 having several interfacing finned rollers can effectively convey problematic seed materials from the hopper 106.

Referring again to FIG. 6, the seed flow controller 108 includes a drive system to drive and control rotation of the first roller 414 and the second roller 416. The drive system can include a first motor unit 620 to drive the first roller 414 and a second motor unit 622 to drive the second roller 416. The motor units may be, for example stepper motors, controlled by the planting control system 208. More particularly, the planting control system 208 can include an electronics compartment mounted on the seed flow controller chassis, and electronics within the electronics compartment can deliver control pulses to the stepper motors to control output of the motor output shafts. The planting control system 208 can operate the rollers using simple on/off operation, or through the use of sensors and programmed conditional behaviors. For example, the planting control system 208 can include sensors to monitor reaction torque supplied to the motor units to determine whether the seed material is jamming within the seed flow controller 108. In response to such determination, the planting control system 208 can reverse the rollers and/or increase the torque to overcome the jam.

In an embodiment, the motor output shaft drives respective key shafts that are engaged with the rollers to drive roller rotation. For example, the drive system can include a first key shaft 624 that is mechanically coupled to the motor output shaft of the first motor unit 620 to drive the first roller 414. Similarly, the drive system can include a second key shaft 626 that is mechanically coupled to the motor output shaft of the second motor unit 622 to drive the second roller 416. The key shafts can be keyed to allow the shafts to engage and drive a corresponding keyway in their respective rollers. More particularly, the first roller 414 can include a first keyway 720 (FIG. 7) extending along the first roller axis 610. The first key shaft 624 can extend through the first keyway 720. The first key shaft 624 and the first keyway 720 can have matching profiles. For example, the key shaft and the keyway can have rectangular cross-sectional profiles. The profiles can be sized in a slip fit such that, as the first key shaft 624 is driven by the first motor unit 620, the key shaft transfers torque from the motor output shaft to the roller core 704, causing the first roller 414 to rotate about the first roller axis 610. Torque can be similarly transmitted from the second motor unit 622 to the second roller 416 via engagement between the second key shaft 626 and a keyway of the second roller 416. The key shafts can be supported as simple beams across the span of the housing outlet 406. Accordingly, the key shafts can suspend the two rollers on the seed flow controller 108. The suspended driveshaft configuration allows the rollers to rotate freely within the housing cavity 412 to convey the seed material.

The seed flow controller 108 can have a modular construction. For example, the rollers may be easily swapped out for different rollers. Accordingly, the assembly and removal of rollers can be accommodated to allow for a same roller type to be exchanged to address roller wear or a different roller type to be exchanged to suit a different seed material. The modularity and use of swappable components allows for easy adaptation and modification of the seed flow controller 108. Accordingly, the seed flow controller 108 can be quickly and easily modified to meet new operational situations, such as seed materials having different consistencies. Furthermore, the seed flow controller 108 can be operationally robust as a result of the modularity because the drive system and rollers can be simple to maintain and easy to upgrade or replace.

In an embodiment, the keyed drive shafts of the rollers are suspended in rotational bearings and/or couplings. For example, the keyed shaft at the first roller end 604 may be supported in a roller bearing mounted on the seed flow controller chassis. An end of the keyed shaft at the second roller end 606 can be mounted in a motor coupling 640. The motor coupling 640 can transfer drive power from the motor unit, e.g., the motor output shaft, to the keyed shaft. In an embodiment, the motor coupling 640 is a self-aligning coupling that allows connection and disconnection of the motor unit from the keyed shaft. The self-aligning couplings can accommodate slight misalignments between the key shafts and the motor output shafts. Accordingly, the motor couplings 640 can quickly and reliably connect and disconnect the motor units from the rollers to allow the motor units and/or the rollers to be easily swapped out with replacement parts.

Figure 11:
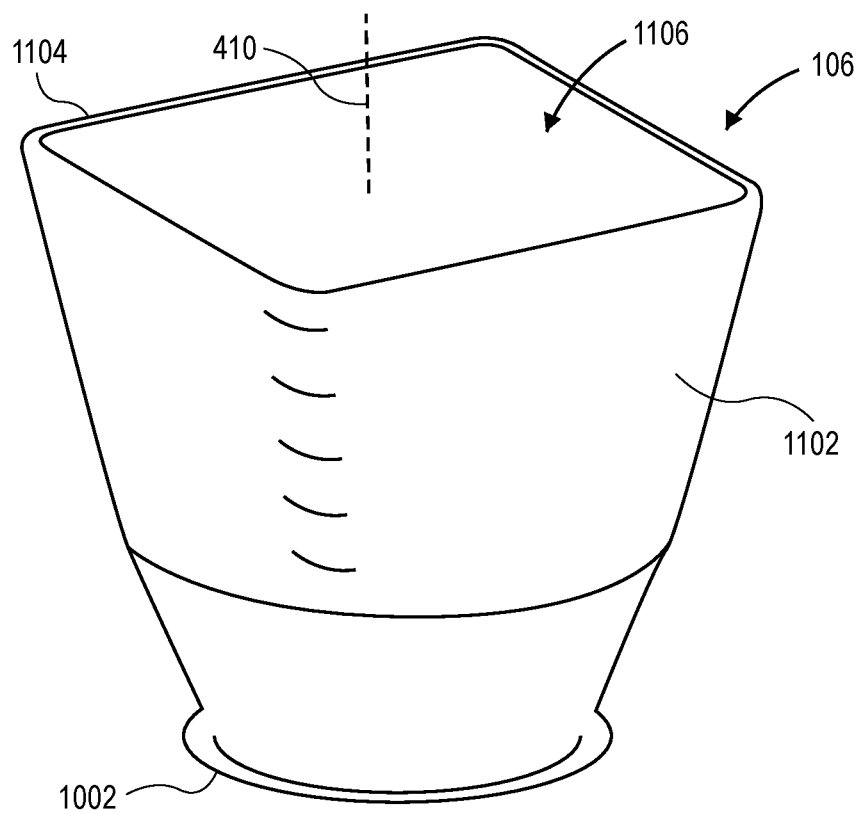
FIG. 11 is a perspective view of a hopper, in accordance with an embodiment.

Referring to FIG. 11, a perspective view of a hopper is shown in accordance with an embodiment. The seed flow controller 108 described above provides a modular system that can reliably and controllably convey the seed material from the hopper 106 to the spreader 110. Problematic materials may bind outside of the seed flow controller 108, however. For example, contain problematic seed materials may bridge and bind within the hopper 106, creating residual seed material within the hopper 106 even after the seed flow controller 108 has emptied the housing cavity 412. In an embodiment, the hopper 106 can incorporate features to reduce a likelihood or overcome such flow disruptions.

In an embodiment, the hopper 106 includes a hopper wall 1102 extending upward along the central axis 410 from the hopper outlet 1002 to a hopper inlet 1104. The hopper wall 1102 can extend around a hopper cavity 1106 within which the seed material is stored by the hopper 106. Thus, like the seed flow controller 108, the hopper 106 allows for the seed material to move downward along the central axis 410 toward the spreader 110. A cross-sectional profile of the hopper wall 1102 can vary between the hopper inlet 1104 and the hopper outlet 1002. For example, the wall profile may be elliptical and/or circular in a region of the hopper 106 adjacent to the hopper outlet 1002. By contrast, the wall profile may be polygonal and/or rectangular in a region of the hopper 106 adjacent to the hopper inlet 1104. The profiles can smoothly transition into each other. More particularly, an inner surface of the hopper wall 1102 may be smooth between the hopper inlet 1104 and the hopper outlet 1002 to reduce locations that problematic material can snag on. The smooth wall facilitates sliding of the seed material downward through the hopper 106 as the seed flow controller 108 conveys the seed material through the rollers.

Referring to FIG. 12A, a schematic view of a hopper including an agitator is shown in accordance with an embodiment. An agitator 210 may optionally be mounted within the hopper 106 to provide mechanical disruption to the seed material stored in the hopper 106. The disruption can reduce a likelihood of bridging or stopping of material flow through the hopper outlet 1002. In an embodiment, the agitator 210 includes an agitator motor 1204 mounted near the hopper inlet 1104. More particularly, the agitator motor 1204 can be mounted above the seed material in the hopper cavity 1106. Such placement can avoid contact between the seed material and non-moving internal structures, e.g., the motor housing. As described above, problematic seed materials can bridge and bind when exposed to non-moving parts, and thus, isolating the seed material from the non-moving parts can reduce a likelihood of stopping the seed flow.

The agitator motor 1204 may connect to an agitator arm 1202 that protrudes into the storage area. The agitator arm 1202 can include a drive section 1206 extending along the central axis 410 into the storage area. The agitator arm 1202 may also include a mixer section 1208 extending radially outward from the drive section 1206. Mixer section 1208 can protrude into the storage area containing the seed material and move around the central axis 410 during the mixing process to disrupt the seed material. More particularly, the agitator motor 1204 can deliver torque to the drive section 1206, which rotates along the central axis 410, to transmit the torque to the mixer section 1208, which rotates about the central axis 410. Given that both the drive section 1206 and the mixer section 1208 of the agitator arm 1202 are moving during the mixing process, the agitator arm 1202 does not provide a static surface for the seed material to bind to. Accordingly, the agitator 210 may have no stationary structures in a flow path of the seed material, and may instead have only moving parts inside of the seed storage area to break up clumps of the seed material and to cause the seed material to slide downward through the hopper outlet 1002.

In an embodiment, the planting system 100 includes a support frame 1209 mounted on the hopper wall 1102 to support the agitator 210 within the hopper cavity 1106. The support frame 1209 can extend across the hopper cavity 1106, e.g., from a first location on the hopper wall 1102 to a diametrically opposed location on the hopper wall 1102. For example, the support frame 1209 can include a crossbar (FIG. 13) extending laterally through the hopper cavity 1106. The support frame 1209 may be a non-moving component. For example, the drive section 1206 of the agitator 210 may be rotatably coupled to the support frame 1209, and the support frame 1209 may be fixedly coupled to the hopper wall 1102. As described above, any non-moving mechanism within the seed material can increase a likelihood that the seed material will bind. To reduce this risk, the support frame 1209 may be located within the hopper cavity 1106 above a fill line of the seed material. Alternatively, the support frame 1209 may be located high enough in the hopper cavity 1106 such that even if seed material binds or clumps together on the support frame 1209, the clumps will eventually drop off as the level of the seed material lowers within the hopper 106. For example, the support frame 1209 may be nearer to the hopper inlet 1104 than the hopper outlet 1002. By placing the support frame 1209 above the halfway point of the hopper 106, even if the seed material bridges as the seed flow controller 108 conveys the material, the bridging seed material can fall from the support frame 1209 to eventually be dispensed by the planting system 100.

In an embodiment, the agitator arm 1202 that is rotatably coupled to the support frame 1209 can have the bent "L" shape shown in FIG. 12A. More particularly, the mixer section 1208 can have a single arm subsegment extending at an angle from an end of the drive section 1206 relative to the central axis 410. Several other embodiments of the agitator 210 may be contemplated by one skilled in the art to include an agitator arm 1202 having no static surfaces within the storage region of the hopper 106. One such alternative embodiment is described below.

Referring to FIG. 12B, a schematic view of a hopper including an agitator is shown in accordance with an embodiment. The agitator arm 1202 that is rotatably coupled to the support frame 1209 can have a multi-segment mixer section 1208. For example, the multi-segment mixer section 1208 may have a first segment extending radially outward from the drive section 1206 and a second subsegment 1212 tapering radially inward toward the central axis 410 from the first subsegment 1210. As the drive section 1206 rotates along the longitudinal axis, the second subsegment can sweep through the seed material. More particularly, the second subsegment 1212 can sweep through a conical space parallel to an interior surface of the hopper 106. Like the bent "L" embodiment shown in FIG. 12A, the embodiment shown in FIG. 12B can disrupt the seed material to reduce a likelihood of clumping and bridging that may impede flow through the hopper outlet 1002. In both embodiments, there is no fixed or static surface on the agitator 210 in the lower half of the hopper 106. Elimination of static surfaces reduces the likelihood of seed bridging.

Referring to FIG. 13, a pictorial view of an agitator within a hopper is shown in accordance with an embodiment. The illustrated example of the planting system 100 includes an agitator 210 having the bent "L" arm configuration. An angle and length of the mixer section 1208 extending radially outward from the drive section 1206 may be set such that a distal end 1302 of the arm is located near a transition 1304 between the hopper wall 1102 and the housing wall 408. For example, the distal end 1302 can be laterally offset and/or at a same vertical location as the transition between the funnels of the hopper 106 and the seed flow controller 108. In an embodiment, the combined funnel shape of the hopper 106 and housing walls 408 transitions from a first angle 710 within the hopper 106 to a second angle 710 within a housing 402. For example, a housing wall 408 can have a housing taper angle relative the central axis 410, and the hopper wall 1102 can have a hopper taper angle relative central axis 410, which may be different than the housing taper angle. By way of example, the hopper taper angle may be 20 degrees, measured between the central axis 410 and the hopper wall 1102. By contrast, housing taper angle may be greater than the hopper taper angle, e.g., 60 degrees, measured between the central axis 410 and the housing wall 408. This transition and change in steepness between the hopper wall 1102 and housing wall 408 may increase a likelihood of seed binding or bridging at that location due to the change in wall angle. Placement of the distal end 1302 of the agitator arm 1202 within the region of the transition 1304 can localize mixing within that region and therefore reduce the likelihood of seed binding. More particularly, seed flow from the hopper 106 into the housing 402 and through the first roller 414 in the second roller 416 may be promoted by the agitator arm geometry and relative location between the agitator arm 1202 and the funneled wall. Accordingly, the combination of the agitator 210 within the hopper 106 and the multi-roller configuration of the seed flow controller 108 can enhance disruption and conveyance of the seed material from the hopper 106 to the spreader 110.

Figure 14:
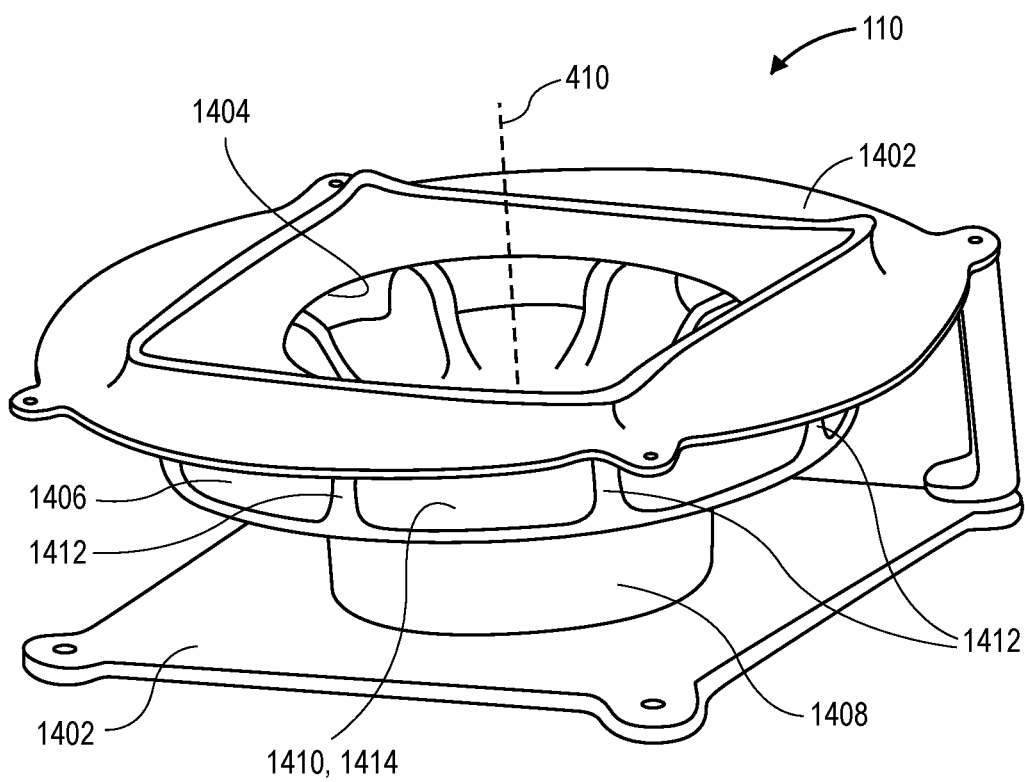
FIG. 14 is a top perspective view of a spreader, in accordance with an embodiment.

Referring to FIG. 14, a top perspective view of a spreader is shown in accordance with an embodiment. The spreader 110 can include a spreader frame 1402 to mount on the housing 402 of the seed flow controller 108. The spreader frame 1402 can include a spreader inlet 1404 that is coupled to the housing outlet 406 when the spreader 110 is mounted on the seed flow controller 108. The spreader 110 includes a spreader plate 1406 rotatably mounted below the spreader inlet 1404 and/or the housing outlet 406. More particularly, the spreader plate 1406 may be mounted on a spreader motor 1408, and the spreader motor 1408 can be mounted on spreader frame 1402. An output shaft of the spreader motor 1408 can be aligned with the central axis 410 of the planting system 100 such that the spreader plate 1406 rotates about the central axis 410.

The spreader plate 1406 can include a base 1410 extending orthogonal to the central axis 410. Furthermore, several blades 1412 can extend radially outward along a top surface 1414 of the base 1410 from radially inward edges near the central axis 410 to radially outward edges at a perimeter of the base 1410.

Figure 15:
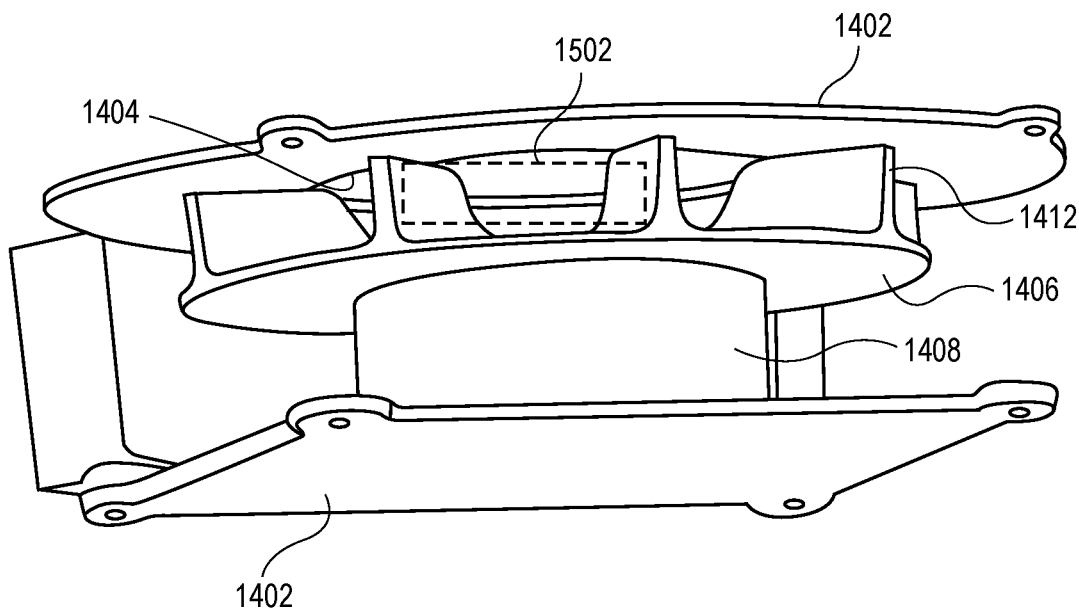
FIG. 15 is a bottom perspective view of a spreader, in accordance with an embodiment.

Referring to FIG. 15, a bottom perspective view of a spreader is shown in accordance with an embodiment. The spreader 110 can be a centrifugal spreader that receives the seed material through the spreader inlet 1404 and expels the seed material through a spreader outlet 1502. The seed material can pass downward through the spreader inlet 1404 along the central axis 410 and be expelled radially outward through the spreader outlet 1502 between the blades 1412. During operation, the spreader motor 1408 can rotate the spreader plate 1406 at high rotational speeds to create suction at the spreader inlet 1404. Accordingly, not only is the seed material forced downward by the rollers of the seed flow controller 108, but the conveyance of the seed material is assisted by suction created by the spreader plate 1406.

Figure 16A:
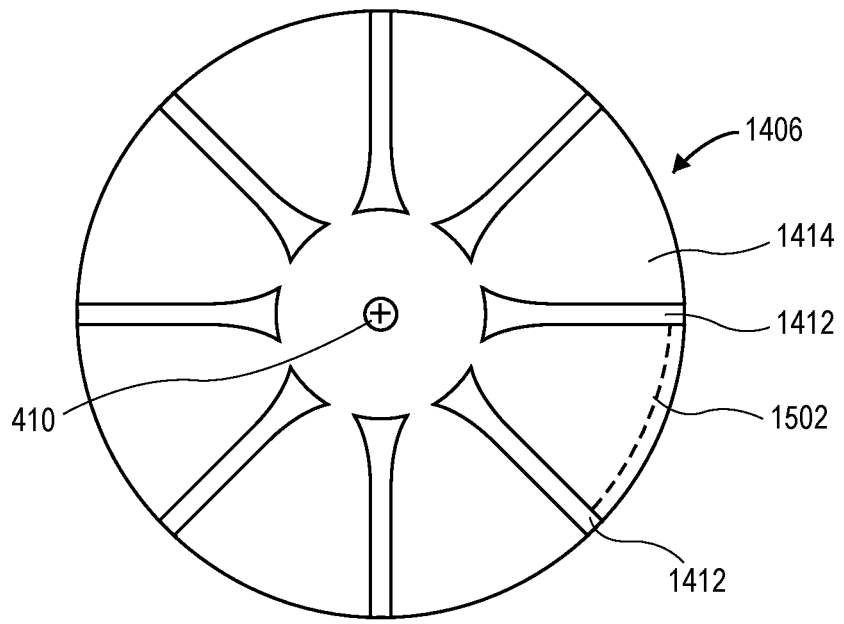
FIGS. 16A-16B are top views of a spreader plate of a spreader, in accordance with an embodiment.

Referring to FIG. 16A, a top view of a spreader plate of a spreader is shown in accordance with an embodiment. The rotating centrifugal spreader plate 1406 can eject seeds laterally outward over the target geography. The suction pressure and the ejection speed and distance of the seed material may be affected by the blade parameters. In an embodiment, the blades 1412 extend straightly over the top surface 1414 and radially outward from the central axis 410. The straight blades 1412 can eject the seed material laterally outward through the spreader outlet 1502 at a first speed.

Figure 16B:
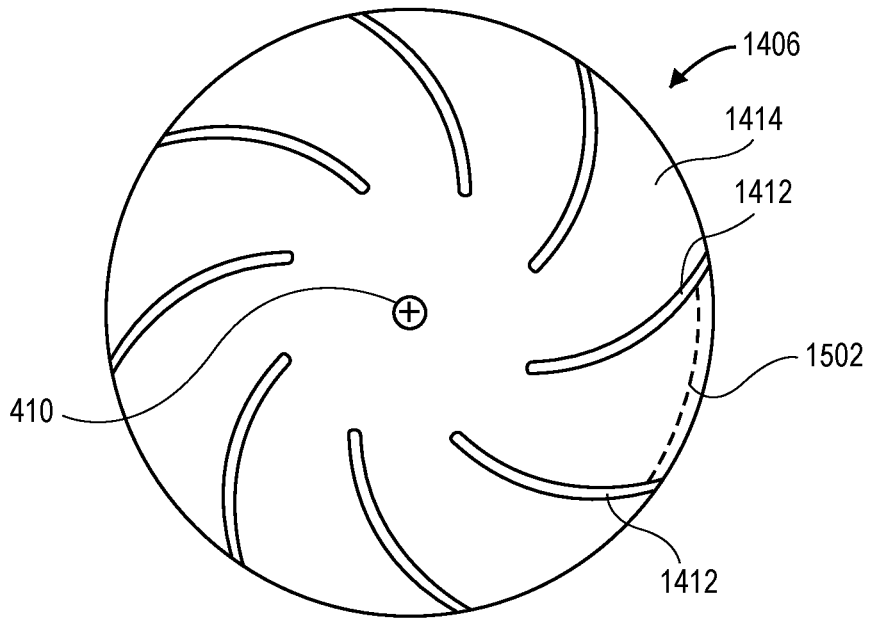

Referring to FIG. 16B, a top view of a spreader plate of a spreader is shown in accordance with an embodiment. One or more of the blades 1412 can curve radially outward along the top surface 1414. More particularly, the blades 1412 can have a curved profile having a circumferential component, in contrast to the purely radial component of the blades 1412 shown in FIG. 16A. The curved blades 1412 may create a different suction pressure and eject the seeds through the spreader outlet 1502 at a different speed than that produced by the straight blades 1412. Accordingly, it will be appreciated that the blade configuration may be modified to suit the seed material being used during the planting process. Lighter or less dense seed material may require less centrifugal force to be ejected to a same distance as heavier or more dense seed material, and thus, a first spreader plate may be used to dispense lighter seed material whereas a second spreader plate may be swapped into the planting system 100 to dispense heavier seed material. Accordingly, the spreader 110 supports the benefits of modularity similar to those described above for the seed flow controller 108.

Figure 17:
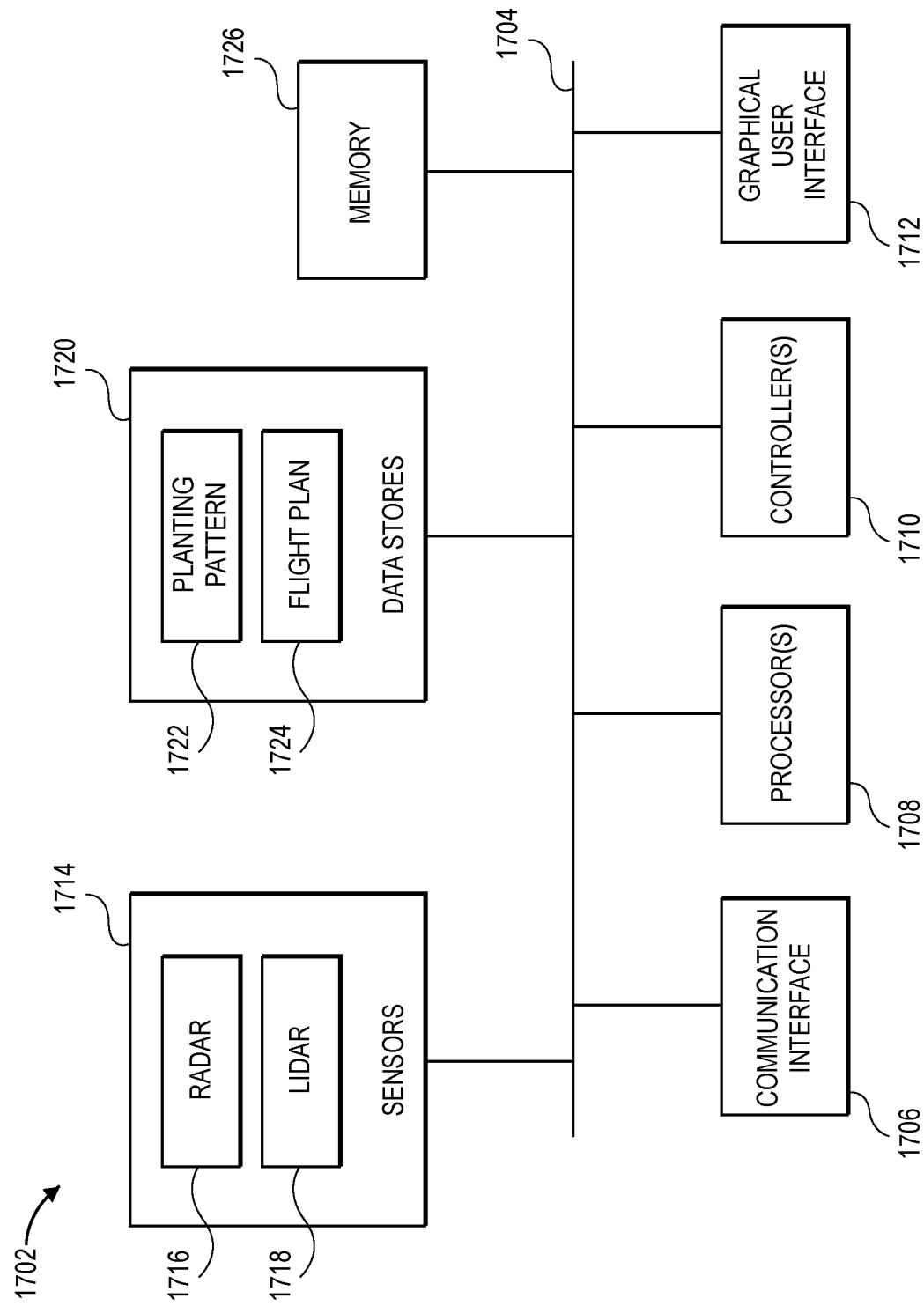
FIG. 17 is a block diagram of a computer system, in accordance with an embodiment.

Referring to FIG. 17, a block diagram of a computer system is shown in accordance with an embodiment. A computer system 1702 can include the planting control system 208 to implement the agitation, conveyance, and spreading functions described above. More particularly, the computer system 1702 can perform computer implemented methods that control the agitation, conveyance, and spreading functions. In an embodiment, one or more processors 1708 of the computer system 1702 can execute instructions stored on a non-transitory computer readable medium to cause the planting system 100 to perform the agitation, conveyance, and spreading functions.

The computer system 1702 can include hardware elements connected via a bus 1704, including a network interface 1706, that enables the computer system 1702 to connect to other computer systems over a local area network (LAN), wide area network (WAN), mobile network (e.g., EDGE, 3G, 4G, or other mobile network), or other network. The network interface 1706 can further include a wired or wireless interface for connecting to infrared, Bluetooth, or other wireless devices, such as other mobile transport platforms. The computer system 1702 can include the one or more processors 1708, such as a central processing unit (CPU), field programmable gate array (FPGA), application-specific integrated circuit (ASIC), network processor, or other processor. Processors 1708 may include single or multi-core processors.

In some embodiments one or more controllers 1710 can be used to control the navigation of the mobile transport platform. The controllers 1710 may include hardware and software controllers 1710 designed to control the various mobile transport platforms described herein. In some embodiments, the computer system 1702 can include a graphical user interface (GUI) 1712. The GUI 1712 can connect to a display (LED, LCD, tablet, touchscreen, or other display) to output user viewable data. In some embodiments, the GUI 1712 can be configured to receive instructions, e.g., through a touchscreen or other interactive interface.

In some embodiments one or more sensors 1714 can be used to navigate and to gather data describing the surrounding area that can be used to create a map of local land characteristics. In some embodiments, the sensor 1714 can include various electromagnetic sensors such as visual, multispectral, hyperspectral, RADAR 1716, LiDAR 1718, and infrared sensors. In some embodiments, the sensors 1714 can include various communication modules such as GPS or other positioning modules and mobile network communication modules.

In some embodiments, the computer system 1702 may include local or remote data stores 1720. Data stores 1720 can include various computer readable storage media, storage systems, and storage services, such as disk drives, CD-ROM, digital versatile disc (DVD), or other optical storage, magnetic cassettes, magnetic tape, magnetic disk storage or other magnetic storage devices, relational databases, object storage systems, local or cloud-based storage services, or any other storage medium, system, or service. The data stores 1720 can include data generated, stored, or otherwise utilized as described herein. For example, the data stores 1720 can include all or portions of a planting pattern 1722 or a flight plan 1724, generated and stored for reference to navigate the planting system 100 to the target geography. Memory 1726 can include various memory technologies, including RAM, ROM, EEPROM, flash memory or other memory technology. Memory 1726 can include executable code to implement methods as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A planting system, comprising:
   an unmanned aerial vehicle (UAV); and
   a seed flow controller coupled to the UAV, wherein the seed flow controller includes
      a housing having a housing inlet, a housing outlet, and a housing wall extending downward along a central axis between the housing inlet and the housing outlet around a housing cavity,
      a first roller mounted within the housing cavity over the housing outlet, wherein the first roller includes a first fin twisting about a first roller axis, and wherein the first roller includes a first outer surface on the first fin, and
      a second roller mounted within the housing cavity over the housing outlet,
   wherein the second roller includes a second outer surface apposed to the first outer surface.

2. The planting system of claim 1, wherein the first outer surface is on a first outer edge of the first fin.

3. The planting system of claim 2, wherein the first fin extends about the first roller axis at an angle to a longitudinal plane containing the first roller axis.

4. The planting system of claim 2, wherein the second roller has a second fin extending about a second roller axis of the second roller, wherein the first fin extends about the first roller axis with a same clocking that the second fin extends about the second roller axis such that the first fin crosses the second fin at a contact point.

5. The planting system of claim 2, wherein the first roller has a first keyway along the first roller axis, and wherein a first key shaft extends through the first keyway.

6. The planting system of claim 1 further comprising:
   a hopper having a hopper outlet coupled to the housing inlet, wherein the hopper includes a hopper wall extending upward along the central axis from the hopper outlet around a hopper cavity, wherein the housing wall has a housing taper angle relative to the central axis, wherein the hopper wall has a hopper taper angle relative to the central axis, and wherein the housing taper angle is greater than the hopper taper angle.

7. The planting system of claim 6 further comprising an agitator mounted within the hopper, wherein the agitator includes a drive section extending along the central axis, and a mixer section extending radially outward from the drive section.

8. The planting system of claim 7 further comprising a support frame mounted on the hopper wall and extending across the hopper cavity, wherein the drive section of the agitator is rotatably coupled to the support frame.

9. The planting system of claim 1 further comprising a spreader coupled to the seed flow controller, wherein the spreader includes a spreader plate rotatably mounted below the housing outlet.

10. The planting system of claim 9, wherein the spreader plate includes a base orthogonal to the central axis and a plurality of blades extending radially outward along a top surface of the base.

11. A planting system, comprising:
    a seed flow controller including
       a housing having a housing inlet, a housing outlet, and a housing wall extending downward along a central axis between the housing inlet and the housing outlet around a housing cavity,
       a first roller mounted within the housing cavity over the housing outlet, wherein the first roller includes a first fin twisting about a first roller axis, and wherein the first roller includes a first outer surface on the first fin, and
       a second roller mounted within the housing cavity over the housing outlet, wherein the second roller includes a second outer surface apposed to the first outer surface; and
    a hopper having a hopper outlet coupled to the housing inlet, wherein the hopper includes a hopper wall extending upward along the central axis from the hopper outlet around a hopper cavity.

12. The planting system of claim 11, wherein the first outer surface is on a first outer edge of the first fin.

13. The planting system of claim 12, wherein the second roller has a second fin extending about a second roller axis of the second roller, wherein the first fin extends about the first roller axis with a same clocking that the second fin extends about the second roller axis such that the first fin crosses the second fin at a contact point.

14. The planting system of claim 12, wherein the first roller has a first keyway along the first roller axis, and wherein a first key shaft extends through the first keyway.

15. The planting system of claim 11 further comprising an agitator mounted within the hopper, wherein the agitator includes a drive section extending along the central axis, and a mixer section extending radially outward from the drive section.

16. A planting system, comprising:
    a seed flow controller including
       a housing having a housing inlet, a housing outlet, and a housing wall extending downward along a central axis between the housing inlet and the housing outlet around a housing cavity,
       a first roller mounted within the housing cavity over the housing outlet, wherein the first roller includes a first fin twisting about a first roller axis, and wherein the first roller includes a first outer surface on the first fin, and
       a second roller mounted within the housing cavity over the housing outlet, wherein the second roller includes a second outer surface apposed to the first outer surface; and
    a spreader coupled to the seed flow controller, wherein the spreader includes a spreader plate rotatably mounted below the housing outlet.

17. The planting system of claim 16, wherein the first outer surface is on a first outer edge of the first fin.

18. The planting system of claim 17, wherein the second roller has a second fin extending about a second roller axis of the second roller, wherein the first fin extends about the first roller axis with a same clocking that the second fin extends about the second roller axis such that the first fin crosses the second fin at a contact point.

19. The planting system of claim 17, wherein the first roller has a first keyway along the first roller axis, and wherein a first key shaft extends through the first keyway.

20. The planting system of claim 16, wherein the spreader plate includes a base orthogonal to the central axis and a plurality of blades extending radially outward along a top surface of the base.

\* \* \* \* \*